United States Patent [19]
Bjorksten et al.

[11] Patent Number: 5,764,549
[45] Date of Patent: Jun. 9, 1998

[54] FAST FLOATING POINT RESULT ALIGNMENT APPARATUS

[75] Inventors: Andrew A. Bjorksten; Donald G. Mikan, Jr.; Martin S. Schmookler, all of Austin, Tex.

[73] Assignee: International Business Machines Corporation, Armonk, N.Y.

[21] Appl. No.: 639,573

[22] Filed: Apr. 29, 1996

[51] Int. Cl.$^6$ .................................................. G06F 5/01
[52] U.S. Cl. ............................................ 364/715.04
[58] Field of Search ........................ 364/715.04, 715.1

[56] References Cited

U.S. PATENT DOCUMENTS

| | | | |
|---|---|---|---|
| 4,794,557 | 12/1988 | Yoshida et al. | 364/715.04 |
| 4,922,446 | 5/1990 | Zurawski et al. | 364/715.04 |
| 4,926,369 | 5/1990 | Hokenek et al. | 364/715.04 |
| 4,926,370 | 5/1990 | Brown et al. | 364/748 |
| 5,058,048 | 10/1991 | Gupta et al. | 364/748 |
| 5,257,215 | 10/1993 | Poon | 364/748 |
| 5,267,186 | 11/1993 | Gupta et al. | 364/715.04 |
| 5,375,078 | 12/1994 | Hrusecky et al. | 364/748 |
| 5,646,875 | 7/1997 | Taborn et al. | 364/715.04 |
| 5,668,984 | 9/1997 | Taborn et al. | 364/715.04 |
| 5,684,729 | 11/1997 | Yamuda et al. | 364/715.04 |

OTHER PUBLICATIONS

Hokenek et al., "Leading–zero anticipator (LZA) in the IBM RISC System/6000 . . ." IBM J. Res. Develop., vol. 34, No. 1, Jan. 1990, pp. 71–77.

*Primary Examiner*—David H. Malzahn
*Attorney, Agent, or Firm*—Anthony V.S. England; Brian F. Russell; Andrew J. Dillon

[57] ABSTRACT

A device for aligning the radix point of an unaligned binary result of a floating point operation to a normalized or denormalized position is provided. The device comprises an alignment circuit that produces a shift alignment vector indicating the position of the most significant bit of the unaligned result that is set, when a normalized result is required, and that produces a shift alignment vector indicating the position of a bit of the unaligned result having the weight of a minimum allowable exponent for a given format, when a denormalized result is required. A shift register responsive to the alignment circuit shifts the unaligned result by the number of bits indicated by the shift alignment vector. The bit of the unaligned result having the weight of the minimum allowable exponent for the given format is determined by subtracting the binary value of the minimum allowable exponent from the binary value of the most significant bit of the unaligned result, wherein the difference indicates the number of bits from the most significant bit that the bit having the weight of the minimum allowable exponent is positioned.

6 Claims, 4 Drawing Sheets

FAST FLOATING POINT RESULT ALIGNMENT APPARATUS

BACKGROUND OF THE INVENTION

1. Technical Field

The present invention relates in general to a device for normalizing or denormalizing the result of a floating point operation, and in particular to a leading zero detection circuit for normalizing or denormalizing a floating point operation result.

2. Description of the Related Art

In electronic computations, normalization is used as a means for referencing a number to a fixed radix point. Normalization strips out all leading bits such that the two bits immediately adjacent to the radix point are of opposite polarity. Table I exemplifies a 32-bit register containing certain floating point numbers. When normalizing unnormalized numbers, the bits in the unnormalized numbers will be shifted toward the most significant bit (MSB) of the register until the bits on either side of the radix point are of opposite value. The numbers are then considered to be normalized as indicated in the table. It will be seen that a negative number is normalized in the same manner as a positive number. After the illustrated operations, it is necessary that the exponent of the floating-point numbers be adjusted according to the shifted amount.

TABLE I

|  | Radix Point |
|---|---|
| Unnormalized Positive Number | 0.00000010111100011011001110000100<br>MSB                  LSB |
| After Normalization | 0.10111100011011001110001000000000<br>MSB                  LSB |
| Unnormalized Negative Number | 1.11111101000011100100110001111011<br>MSB                  LSB |
| After Normalization | 1.01000011001001100011101100000<br>MSB                  LSB |

Heretofore, in order to normalize a floating point addition, typically the following three steps were performed:

1. The two terms or operands A and B were added (a process requiring a minimum of log(N) time);
2. The result was searched for the leading 0/1 (depending upon the sign of the result), that is, the "leading zero" was detected (LZD); and
3. The result of the addition was shifted by an appropriate amount.

In modern superscalar microprocessors, it is advantageous to incorporate floating-point instructions efficiently to eliminate the need for additional logic that will take up valuable chip area. Unfortunately, in the prior art, the denormalization of a floating-point result is not performed efficiently. A denormalized number is a number too small to be normalized using the minimum allowable exponent ($E_{min}$) of the system's output format. In the prior art, an LZA would normalize all results and if a denormalized result is required, the result would again be passed through the logic to perform the denormalization. This additional logic consumes valuable logic area on the chip, increases the complexity of the circuitry, and decreases efficiency.

What is needed is a device for performing a normalization or denormalization of a floating-point operation result that does not interrupt the instruction flow by first passing the result through logic to normalize the result and returning the result through a second pass of the logic to perform a denormalization. Such a device would allow the elimination of the additional circuitry and complexity introduced by the prior art, and perform a normalization or denormalization in a single pass of the floating-point operation.

SUMMARY OF THE INVENTION

According to the present invention, a device for aligning the radix point of an unaligned binary result of a floating point operation to a normalized or denormalized position is provided. The device comprises an alignment circuit that produces a shift alignment vector indicating the position of the most significant bit of the unaligned result that is set, when a normalized result is required, and that produces a shift alignment vector indicating the position of a bit of the unaligned result having the weight of a minimum allowable exponent for a given format, when a denormalized result is required. A shift register responsive to the alignment circuit shifts the unaligned result by the number of bits indicated by the shift alignment vector. The bit of the unaligned result having the weight of the minimum allowable exponent for the given format is determined by subtracting the binary value of the minimum allowable exponent from the binary value of the most significant bit of the unaligned result, wherein the difference indicates the number of bits from the most significant bit that the bit having the weight of the minimum allowable exponent is positioned.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
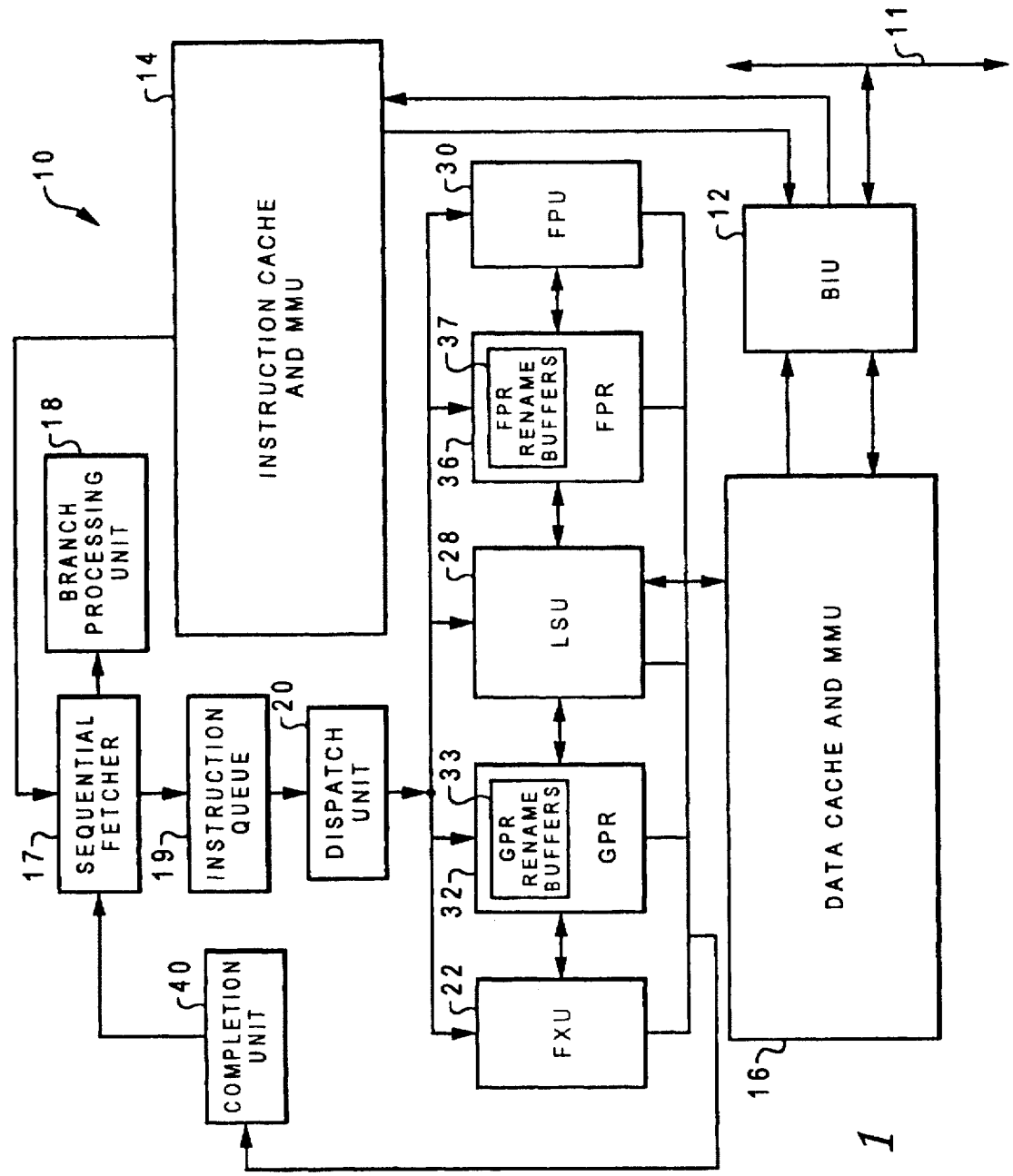
FIG. 1 illustrates a block diagram of a processor for processing information according to a preferred embodiment of the present invention.

With reference now to the figures and in particular with reference to FIG. 1, there is illustrated a block diagram of a processor, indicated generally at 10, for processing information according to a preferred embodiment of the present invention. In the depicted embodiment, processor 10 comprises a single integrated circuit superscalar microprocessor. Accordingly, as discussed further below, processor 10 includes various execution units, registers, buffers, memories, and other functional units, which are all formed by integrated circuitry. In a preferred embodiment of the present invention, processor 10 comprises one of the PowerPC™ line of microprocessors produced by International Business Machines, Inc., which operates according to reduced instruction set computing (RISC) techniques.

As depicted in FIG. 1, processor 10 is coupled to system bus 11 via a bus interface unit (BIU) 12 within processor 10. BIU 12 controls the transfer of information between processor 10 and other devices coupled to system bus 11, such as a main memory (not illustrated). Processor 10, system bus 11, and the other devices coupled to system bus 11 together form a host data processing system. BIU 12 is connected to instruction cache 14 and data cache 16 within processor 10. High speed caches, such as instruction cache 14 and data cache 16, enable processor 10 to achieve relatively fast access time to a subset of data or instructions previously transferred from main memory to the high speed caches, thus improving the speed of operation of the host data processing system. Instruction cache 14 is further coupled to sequential fetcher 17, which fetches instructions from instruction cache 14 during each cycle for execution. Sequential fetcher 17 transfers branch instructions to branch processing unit (BPU) 18 for execution, and transfers sequential instructions to instruction queue 19 for temporary storage before being executed by other execution circuitry within processor 10.

In the depicted embodiment, in addition to BPU 18, the execution circuitry of processor 10 comprises multiple execution units, including fixed-point unit (FXU) 22, load/store unit (LSU) 28, and floating-point unit (FPU) 30. As is well-known to those skilled in the computer art, each of execution units 22, 28, and 30 executes one or more instructions within a particular class of sequential instructions during each processor cycle. For example, FXU 22 performs fixed-point mathematical operations such as addition, subtraction, ANDing, ORing, and XORing, utilizing source operands received from specified general purpose registers (GPRs) 32 or GPR rename buffers 33. Following the execution of a fixed-point instruction, FXU 22 outputs the data results of the instruction to GPR rename buffers 33, which provide temporary storage for the result data until the instruction is completed by transferring the result data from GPR rename buffers 33 to one or more of GPRs 32. Conversely, FPU 30 performs floating-point operations, such as floating-point multiplication and division, on source operands received from floating-point registers (FPRs) 36 or FPR rename buffers 37. FPU 30 outputs data resulting from the execution of floating-point instructions to selected FPR rename buffers 37, which temporarily store the result data until the instructions are completed by transferring the result data from FPR rename buffers 37 to selected FPRs 36. LSU 28 executes floating-point and fixed-point instructions that either load data from memory (i.e., either data cache 16 or main memory) into selected GPRs 32 or FPRs 36, or that store data from a selected one of GPRs 32, GPR rename buffers 33, FPRs 36, or FPR rename buffers 37 to memory.

Processor 10 employs both pipelining and out-of-order execution of instructions to further improve the performance of its superscalar architecture. Accordingly, instructions can be executed by FXU 22, LSU 28, and FPU 30 in any order as long as data dependencies are observed. In addition, instructions are processed by each of FXU 22, LSU 28, and FPU 30 at a sequence of pipeline stages. As is typical of high-performance processors, each instruction is processed at five distinct pipeline stages, namely, fetch, decode/dispatch, execute, finish, and completion.

During the fetch stage, sequential fetcher 17 retrieves one or more instructions associated with one or more memory addresses from instruction cache 14. Sequential instructions fetched from instruction cache 14 are stored by sequential fetcher 17 within instruction queue 19. Fetched branch instructions are removed from the instruction stream and are forwarded to BPU 18 for execution. BPU 18 includes a branch prediction mechanism, such as a branch history table, that enables BPU 18 to speculatively execute unresolved conditional branch instructions by predicting whether the branch will be taken.

During the decode/dispatch stage, dispatch unit 20 decodes and dispatches one or more instructions from instruction queue 19 to the appropriate ones of execution units 22, 28, and 30. Also during the decode/dispatch stage, dispatch unit 20 allocates a rename buffer within GPR rename buffers 33 or FPR rename buffers 37 for each dispatched instruction's result data. According to a preferred embodiment of the present invention, processor 10 dispatches instructions in program order and tracks the program order of the dispatched instructions during out-of-order execution utilizing unique instruction identifiers. In addition to an instruction identifier, each instruction within the execution pipeline of processor 10 has an rA tag and a rB tag, which indicate the sources of the A and B operands for the instruction, and a rD tag that indicates a destination rename buffer within GPR rename buffers 33 or FPR rename buffers 37 for the result data of the instruction.

During the execute stage, execution units 22, 28, and 30, execute instructions received from dispatch unit 20 opportunistically as operands and execution resources for the indicated operations are available. After execution has finished, execution units 22, 28, and 30 store result data within either GPR rename buffers 33 or FPR rename buffers 37, depending upon the instruction type. Then, execution units 22, 28, and 30 notify completion unit 40 which instructions have finished execution. Finally, instructions are completed by completion unit 40 in program order by transferring result data from GPR rename buffers 33 and FPR rename buffers 37 to GPRs 32 and FPRs 36, respectively.

Figure 2:
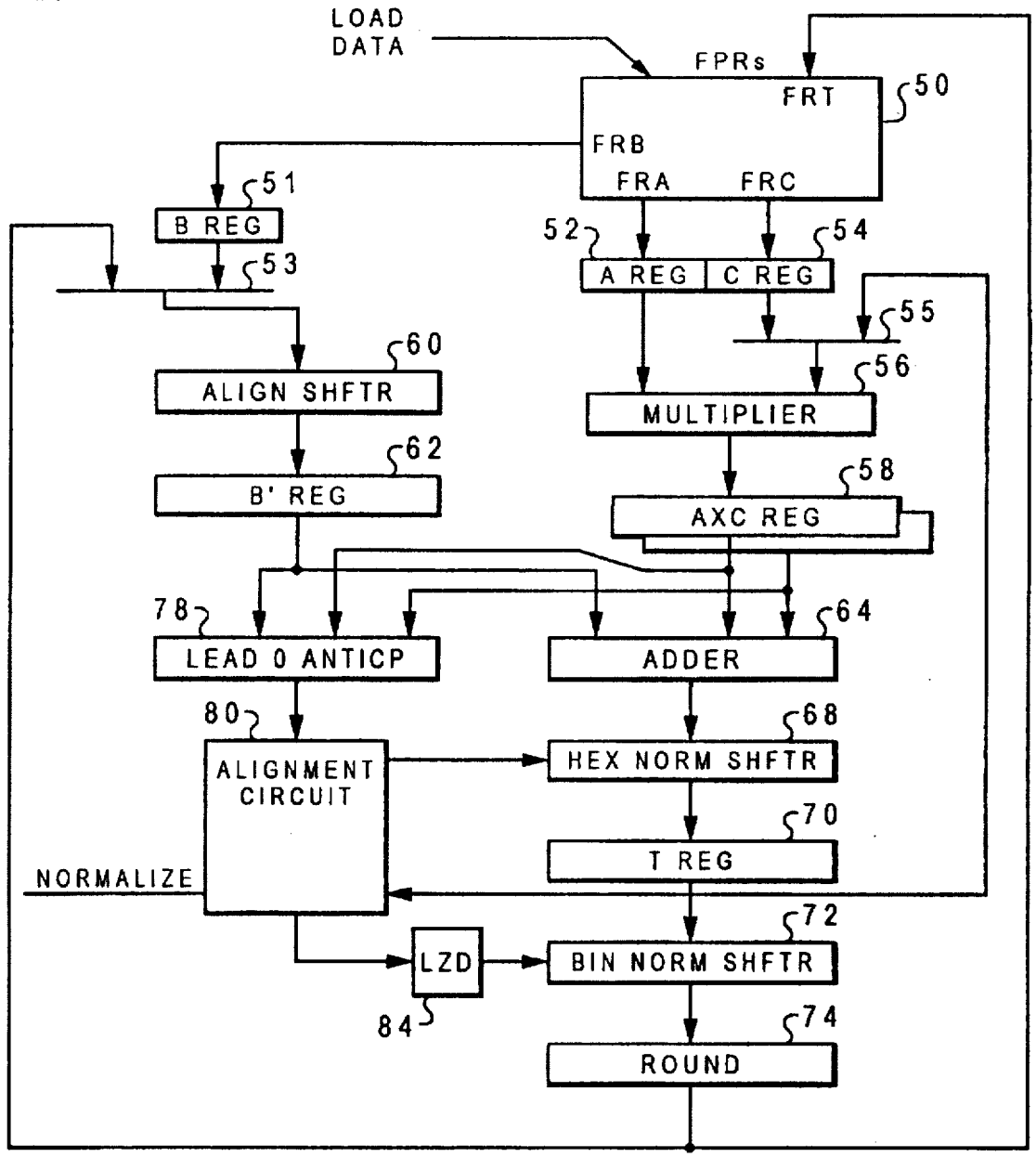
FIG. 2 shows a data flow diagram of a multiply-add floating-point operation as performed in the host data processing system of FIG. 1.

Referring now to FIG. 2, there is shown a data flow diagram of a multiply-add floating-point operation, as performed in the host data processing system of FIG. 1. This floating-point operation can be written as [FPA×FPC]+FPB. These floating point data operands are read from the FPRs 50 into the A Register (A Reg) 52, B Register (B Reg) 51 and C Register (C Reg) 54. The execution unit needs to compute the floating point result, A*C+B, so, first, multiplier 56 computes A*C and places the two bus results in the AXC Register (AXC Reg) 58 in sum and carry form. The alignment shifter (Align Shiftr) 60 shifts B so that the weights of B's bits align with the weights of the A*C product's bits and places the single bus result in the B Register (B Reg) 62. AXC Register 58 and B Register 62 send their results to the Adder 64 to form an intermediate result, and to the Leading Zero Anticipator (Lead 0 Anticp) 78 to compute the approximate number of leading zeros in the intermediate result, and to predict the amount of shifting needed to normalize the floating-point operation result.

The Leading Zero Anticipator (LZA) 78 results are input to Alignment Circuit 80, which determines the correct alignment required to normalize or denormalize the intermediate result, and provides the required controls to the hexadecimal normalizing shifter (Hex Norm Shiftr) 68 and Leading Zero Detector (LZD) 84. If the "NORMALIZE" control is set, the Alignment Circuit 80 will direct a normalization of the floating point result, otherwise the circuit may denormalize the result as needed. The hexadecimal normalizing shifter (Hex Norm Shiftr) 68 aligns the intermediate result as needed to produce the denormalized significand (Mantissa) based on the output of Alignment Circuit 80, and sends its result to the T Register (T Reg) 70. The T Register 70 simply passes the result to the Binary Normalizing Shifter (Bin Norm Shiftr) 72, which is controlled by LZD 84, to complete the normalization/denormalization alignment processes. The Binary Norm Shifter 72 passes the unrounded results to the rounder 74 and to subsequent instructions through the C Bypass Mux 55. After rounding, the rounder 74 passes the final result to subsequent instructions through the B Bypass Mux 53 and to the FPRs 50 to complete the instruction.

The LZA and LZD are devices well known and well understood by those skilled in the art. These devices are described in detail in U.S. Pat. No. 4,926,369 to Hokenec et al., and in E. Hokenec, R. Montoye, "Leading-Zero Anticipator (LZA) in the IBM RISC System/6000 Floating-Point Execution Unit", IBM Journal of Research and Development, Vol. 34 No. 1 January 1990, both of which are incorporated herein by reference.

Figure 3:
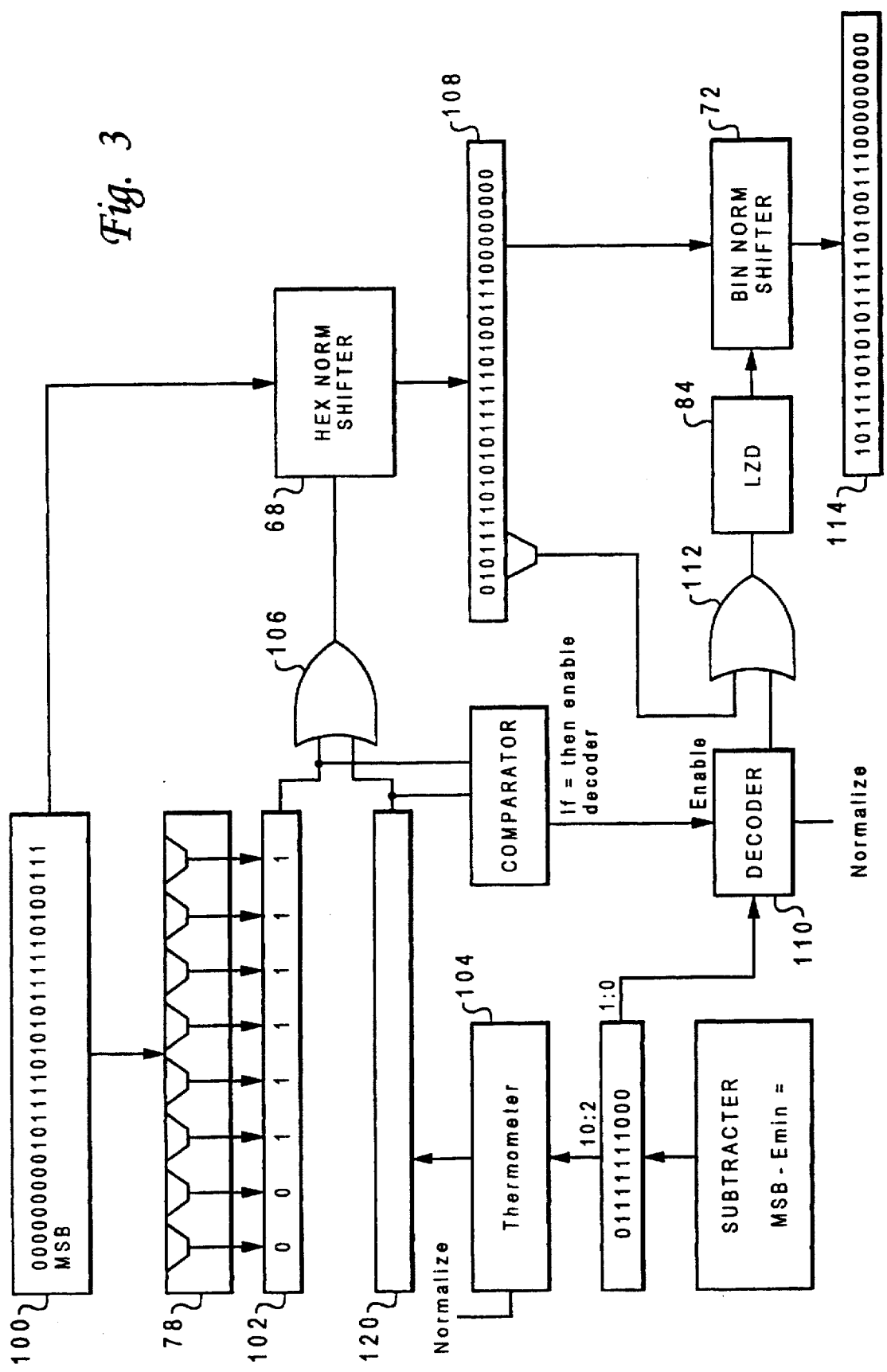
FIG. 3 is a graphical representation showing a preferred embodiment of an alignment circuit which performs the fast floating-point result alignment required to normalize a floating-point operation result, according to the present invention.

Referring now to FIG. 3, there is a graphical representation showing a preferred embodiment of alignment circuit 80, in combination with the LZA, LZD, and Hexadecimal and Binary Shifters, to perform the fast floating-point result alignment required to normalize the floating-point operation result, according to the present invention. As shown in FIG. 3, the result (significand) 100 of the multiply-add operation that will be produced by adder 64 is anticipated by LZA 78. Result 100 is a 32-bit mantissa of the result produced by adder 64 (the exponent is not shown). The radix point for this mantissa is before the MSB, located at the far left digit.

As seen in FIG. 2, LZA 78 receives the same two inputs as adder 64. From these inputs, LZA 78 generates a thermometer code (a string of zeros followed by a string of ones), indicating the number of leading zeros that will be produced by adder 64 in its result. The output of LZA 78 is hex thermometer code 102, wherein each bit of the code represents an associated nibble (4 bits) of the adder's result 100. Further, each bit of the hex thermometer code 102 is reset if all bits of its associated nibble are zero, and is set if any of its associated 4 bits are set. In this way, the leading "1" in the hex thermometer code 102 signifies which nibble of the adder's result 100 has the leading "1" of the result.

In the example of FIG. 3, the "normalize" control signal to hex alignment circuit 80 is set, disabling thermometer 104 and decoder 110 and indicating adder result 100 is to be normalized. Because it is disabled, thermometer 104 will not produce a hex alignment code 120 at the input of ORgate 106. In this case, hexadecimal normalizing shifter 68 will shift result 100, as is indicated by hex thermometer code 102, such that the first nibble containing a "1" is shifted to the leftmost (MSB) position, as is shown by hex norm shifter output 108 contained in T Reg 70.

Also, decoder 110 is disabled so that only the leading nibble (4 bits) of hex norm shifter output 108 provides a control signal at the input of ORgate 112. These four leading bits are passed to LZD 84 where a simple 4-bit leading zero detection counts the leftover leading zeros in this leading nibble. LZD 84 then produces an output control signal to control the binary normalizing shifter 72, which is a 4-bit shifter, to shift hexadecimal output 108 the number of bits necessary to remove the leading zeros detected by LZD 84. This process produces a 32-bit normalized significand 114 for input into rounder 74 and FPRs 50.

Figure 4:
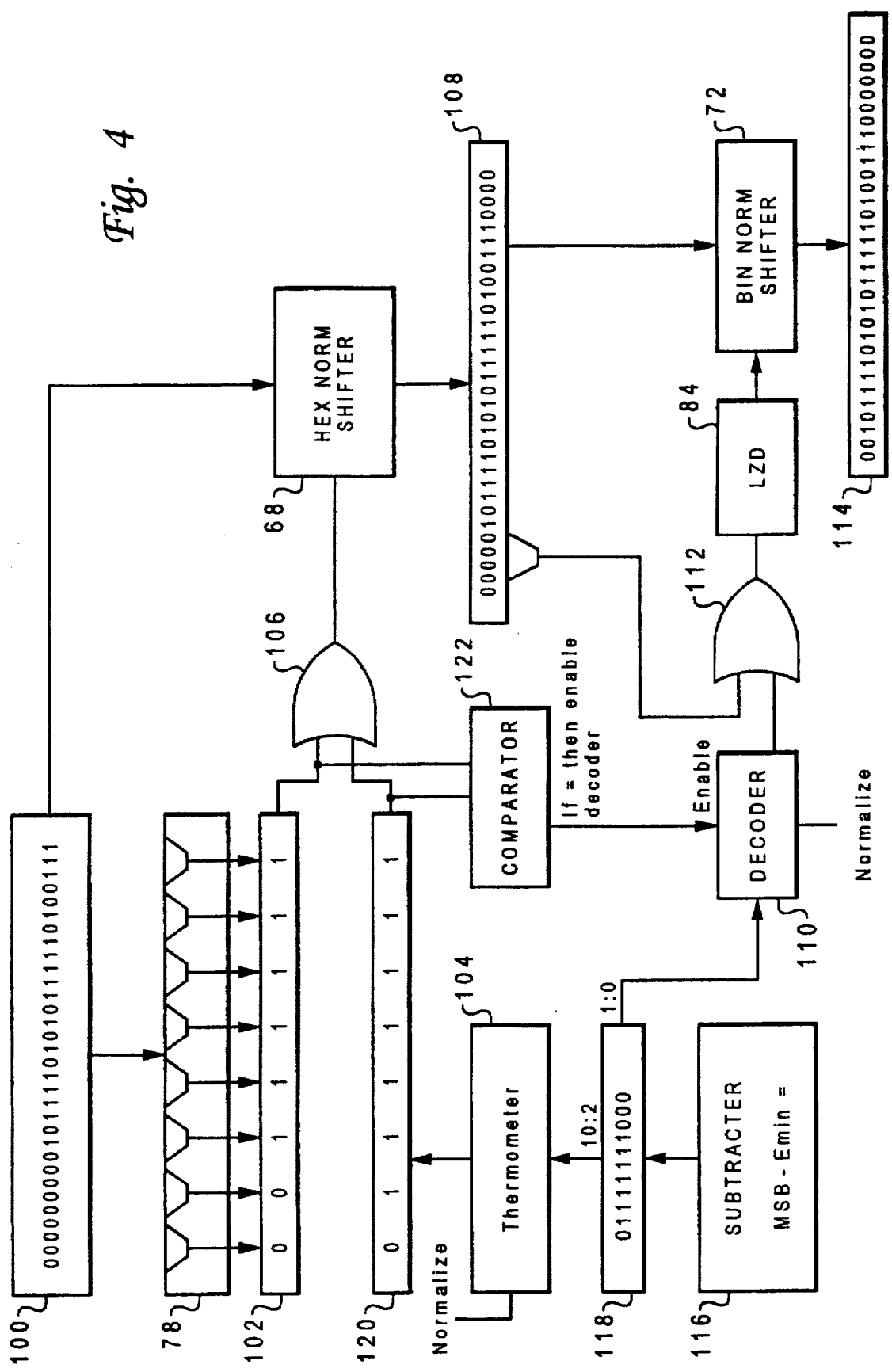
FIG. 4 shows a graphical representation of a preferred embodiment of the alignment circuit which performs the fast floating-point result alignment that denormalizes the floating-point operation result, according to the present invention.

Referring now to FIG. 4, there is shown a graphical representation of a preferred embodiment of the alignment circuit to perform the fast floating-point result alignment that will denormalize the floating-point operation result, according to the present invention. As shown in FIG. 4, 32-bit adder result 100 is passed through LZA 78 to produce the hex thermometer code 102. Hex thermometer code 102 has a bit associated with each nibble of adder result 100. The bit associated with the nibble of adder result 100 containing the leading one is set, as is all bits to the right of this bit. All bits to the left of this bit are reset to indicate leading zeros.

In the example of FIG. 4, the "normalize" control signal to hex alignment circuit 80 is reset, enabling thermometer 104 and decoder 110, and indicating adder result 100 may be denormalized. Because it is enabled, thermometer 104 will produce a hex thermometer code 120 at the input of ORgate 106. As has been explained, a denormalized number is a number too small to be normalized using the minimum allowable exponent ($E_{min}$) of the system's output format. Therefore, to denormalize adder result "100, it must be shifted to the position where the radix point of the $E_{min}$ mantissa is immediately to the left of the MSB. In other words, adder result 100 is not shifted to eliminate all leading zeros, but only as many leading zeros as necessary to place adder result 100 in the format of a denormalized number having the minimum allowable exponent.

The amount of shifting required to place the result at the minimum allowable exponent is calculated by an 11-bit subtractor 116. Subtractor 116 subtracts the value of $E_{min}$ from the weight of the leftmost bit (MSB) in adder result 100 to produce an 11-bit code 118 showing the difference produced by subtractor 116. For example, as seen in FIG. 4, the weight (Exponent) of the MSB (leftmost bit of the register) may be $2^{-120}$ and $E_{min}$ may equal $2^{-127}$. This will produce an 11-bit code 118 showing the difference produced by subtractor 116. The upper nine bits of the 11-bit code 118 are sent to thermometer 104, which produces a denorm thermometer code 120 from the 11-bit code 118. Hex thermometer code 102 is ORed with denorm thermometer code 120 by ORgate 106 to produce a hex norm shift control signal that controls shift hexadecimal normalizing shifter 68. In the example, the hex norm shift control signal directs hex norm shifter 68 to shift adder result 100 only one nibble because only one bit of the control signal is reset, as was directed by denorm thermometer code 120. The output of hex norm shifter 68 is a 32-bit hex shifted result 108.

In the event that hex thermometer code 102 and denorm thermometer code 120 are equal as indicated by comparator 122, an additional binary shift of the hex norm shifter output 108 must be made. This is performed by decoder 110 when enabled by comparator 122. Decoder 110 receives the least significant two bits of the 11-bit code 118. The "normalize" control signal enables decoder 110 to provide a 4-bit output, each bit corresponding to the decode of the least significant two binary bits of 11-bit code 118.

The output of decoder 110 and the first four bits of the hex shifted result 108 are ORed by ORgate 112 to provide the input to LZD 84. LZD 84 counts the leading zeros in this input signal from ORgate 112 to produce a control signal to binary normalizing shifter 72 to shift the hex shifted result 108 a number of positions required to eliminate the leading zeros detected by LZD 84. The output of binary norm shifter 72 is the 32-bit denormalized multiply-add result 114, which is output to rounder 74 and FPRs 50.

As will be appreciated by those skilled in the art, the present invention normalizes or denormalizes result 100 as is needed. If the "normalized" signal is set, a normalization is forced on result 100. If the "normalized" signal is not set, the result is normalized or denormalized as required. Thus, in the example, if hex thermometer code 102 was greater than denorm thermometer code 120, the ORed result from ORgate 106 will equal the greater of the two thermometer codes, in this case hex thermometer code 102. Subsequently, result 100 would be normalized as was described with reference to FIG. 3. Therefore, as will be appreciated, the present invention performs a normalization when the number can be normalized. However, when the bit corresponding to $E_{min}$ is greater than the weight of the leading one of the adder result, a denormalization is automatically performed.

As can be seen, the present invention has provided an device for performing a floating-point operation that produces a normalized or denormalized result as required in a single pass through the logic. The LZA predicts on a 4-bit granularity the amount of shifting of the significand required to produce a normalized result. The LZD adjusts to the bit granularity for the normalization. However, if a denormalized result is required, the hex thermometer code for controlling the hex shifter is modified to shift the result to the radix point of $E_{min}$ (to a 4-bin granularity), instead of to the leading one. Also, the input to the LZD is altered so that the LZD will control the binary normalization shifter to shift the four leading bits of the hex shifted result to appropriately align the final output to the denormalized representation.

While the invention has been particularly shown and described with reference to a preferred embodiment, it will be understood by those skilled in the art that various changes in form and detail may be made therein without departing from the spirit and scope of the invention.

What is claimed is:

1. A device for aligning the radix point of an unaligned binary result of a floating point operation to a normalized or denormalized position, comprising:

an alignment circuit that produces a shift alignment vector indicating the position of the most significant bit of the unaligned result that is set when a normalized result is required, and that produces a shift alignment vector indicating the position of a bit of the unaligned result having the weight of a minimum allowable exponent for a given format when a denormalized result is required; and a shift register responsive to the alignment circuit that shifts the unaligned result by the number of bits indicated by the shift alignment vector.

2. A device according to claim 1, said alignment circuit further comprising a calculator that determines which bit of the unaligned result has the weight of the minimum allowable exponent for the given format by subtracting the binary value of the minimum allowable exponent from the binary value of the most significant bit of the unaligned result, wherein the difference indicates the number of bits from the most significant bit that the bit having the weight of the minimum allowable exponent is positioned.

3. A device for aligning the radix point of an unaligned binary result of a floating point operation to a normalized or denormalized position, comprising:

a detection circuit that detects which bit of the unaligned result has the weight of the minimum allowable exponent for a given format and produces a first thermometer code including one or more bits, wherein each bit in said first thermometer code is associated with one or more bits of the unaligned result, and wherein all bits within the first thermometer code that are associated with unaligned result bits of greater significance than the bit detected by the detection circuit are reset;

a leading zero anticipator circuit that detects the most significant bit of the unaligned result that is set and outputs a second thermometer code including one or more bits, wherein each bit in the second thermometer code is associated with one or more bits of the unaligned result, and wherein all bits of the second thermometer code that are associated with unaligned result bits of greater significance than the bit detected by the leading zero anticipator are reset;

an alignment circuit that performs a logical ORing of the first thermometer code and the second thermometer code; and a shift register responsive to the alignment circuit that shifts the unaligned result by a number of bits equal to the number of reset bits resulting from the logical ORing of the first thermometer code and the second thermometer code.

4. A device according to claim 3, wherein the detection circuit further comprises a calculator that determines which bit of the unaligned result has the weight of the minimum allowable exponent for the given format by subtracting the binary value of the minimum allowable exponent from the binary value of the most significant bit of the unaligned result, wherein the difference indicates the number of bits from the most significant bit that the bit having the weight of the minimum allowable exponent is positioned.

5. A microprocessor that performs floating point operations and produces a normalized or unnormalized binary result, comprising:

a set of floating point registers having storing operands;

a floating point arithmetic circuit that produces an unaligned result of a floating point operation performed on the operands stored in the set of floating point registers;

an alignment circuit that produces a shift alignment vector indicating the position of the most significant bit of the unaligned result that is set when a normalized result is required, and that produces a shift alignment vector indicating the position of a bit of the unaligned result having the weight of a minimum allowable exponent for a given format when a denormalized result is required; and a shift register responsive to the alignment circuit that shifts the unaligned result by the number of bits indicated by the shift alignment vector.

6. A microprocessor according to claim 5, said alignment circuit further comprising a calculator that determines which bit of the unaligned result has the weight of the minimum allowable exponent for the given format by subtracting the binary value of the minimum allowable exponent from the binary value of the most significant bit of the unaligned result, wherein the difference indicates the number of bits from the most significant bit that the bit having the weight of the minimum allowable exponent is positioned.

* * * * *